(12) United States Patent
Shiota et al.

(10) Patent No.: US 7,281,021 B2
(45) Date of Patent: Oct. 9, 2007

(54) METHOD, APPARATUS, AND COMPUTER PROGRAM FOR GENERATING ALBUMS

(75) Inventors: Kazuo Shiota, Tokyo (JP); Atsushi Ase, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 258 days.

(21) Appl. No.: 10/669,350

(22) Filed: Sep. 25, 2003

(65) Prior Publication Data

US 2004/0064338 A1 Apr. 1, 2004

(30) Foreign Application Priority Data

Sep. 27, 2002 (JP) ............... 2002-282630

(51) Int. Cl.
- G06F 17/00 (2006.01)
- G06F 17/30 (2006.01)
- G06F 7/00 (2006.01)
- G06K 9/36 (2006.01)
- G01C 21/26 (2006.01)

(52) U.S. Cl. ............... 707/104.1; 707/3; 707/4; 707/5; 701/211; 382/175; 382/284

(58) Field of Classification Search .......... 707/3, 707/4, 5, 104.1, 211; 340/995.1, 996; 701/211; 705/1; 382/175, 284

See application file for complete search history.

(56) References Cited

U.S. PATENT DOCUMENTS

| | | | |
|---|---|---|---|
| 6,437,797 B1 | 8/2002 | Ota | 345/638 |
| 6,636,648 B2 * | 10/2003 | Loui et al. | 382/284 |
| 6,832,101 B1 * | 12/2004 | Kino | 455/550.1 |
| 2002/0021281 A1 | 2/2002 | Asami | 345/156 |
| 2002/0038180 A1 | 3/2002 | Bellesfield et al. | 701/202 |

(Continued)

FOREIGN PATENT DOCUMENTS

EP 0572129 A1 12/1993

(Continued)

OTHER PUBLICATIONS

Yagawa et al., The Digital Album: A Personal File-tainment System, 1996, IEEE, pp. 433-439.*

(Continued)

*Primary Examiner*—Apu Mofiz
*Assistant Examiner*—Cindy Nguyen
(74) *Attorney, Agent, or Firm*—Birch, Stewart, Kolasch & Birch, LLP

(57) ABSTRACT

Correlation between images and photography locations thereof is facilitated when generating an album of images photographed during a trip. Map data sets are stored in a storage means of an album generation support server. A user accesses the album generation support server from a personal computer to request album generation. Screens for transmitting image data sets and for prompting input of data that specifies a travel route are displayed at the personal computer. The user inputs data regarding a departure point, a departure time, a final destination, etc., and transmits the image data sets to the album generation support server. An album generation server generates travel route data representing the user's travel route based on the input data, estimates locations along the travel route where the image data sets were photographed based on time data attached thereto, and generates album data by correlating the image data sets with a map.

16 Claims, 14 Drawing Sheets

U.S. PATENT DOCUMENTS

2002/0093435 A1* 7/2002 Baron .................... 340/995
2002/0186412 A1* 12/2002 Murashita ................ 358/1.16

FOREIGN PATENT DOCUMENTS

| JP | 10-126731 A | 5/1998 |
| JP | 10-181241 A | 7/1998 |
| JP | 2002-82957 A | 3/2002 |
| JP | 2002-259389 A | 9/2002 |

OTHER PUBLICATIONS

Stephen E. Reutebuch, ROUTES: A Computer Program for Preliminary Route Location, Aug. 1988, pp. 1-18.*

* cited by examiner

METHOD, APPARATUS, AND COMPUTER PROGRAM FOR GENERATING ALBUMS

This nonprovisional application claims priority under 35 U.S.C. § 119(a) on Patent Application Ser. No(s). 2002-282630 filed in JAPAN on Sep. 27, 2002, which is(are) herein incorporated by reference.

BACKGROUND OF THE INVENTION

1. Field of the Invention

The present invention relates a method and apparatus for generating an album based on image data photographed during a trip. The present invention also relates to a computer program that causes a computer to execute the method for generating the album.

2. Description of the Related Art

In case an album is generated containing photographs obtained during a trip, the photographs are developed and printed, along with maps, illustrations, and descriptions. Meanwhile, generation of digital albums, which employ image data obtained by digital cameras, or image data obtained by digitally scanning images recorded on silver salt films, is also being performed.

A system for generating digital albums of this type, wherein image data sets which have, for example, data describing date and time of photography in their tag information, is interfaced with a layout database, which contains maps, coordinates on the maps, arrival time and departure time, has been proposed (refer to Japanese Unexamined Patent Publication No. 10 (1998)-126731). In this system, image data sets and a map is attached to a layout selected from the layout database. This system enables easy generation of trip photograph albums, while eliminating mistakes such as misplacement of photographs.

There is also known a system wherein image data sets and locations where the image data sets were photographed are correlated by a manual operation. In this system, the photography locations are displayed on a map. According to this system, the correspondent relationships between image data sets and photography locations are easily recognized.

In the system disclosed in Japanese Unexamined Patent Publication No. 10(1998)-126731, the time period during which a user is to be at each location on the map is predetermined. Image data sets which have photography dates and times in their tag information corresponding to the predetermined time periods are attached to each location on the map. For this reason, if a user arrives at a certain location late, and photographs image data sets at the location at a time different from the predetermined time period corresponding to the location, the image data sets photographed thereat cannot be attached to the position corresponding thereto on the map. In addition, if there is temporal shift between the predetermined time period and the photography dates and times attached to image data sets, there is a problem that image data sets photographed at a location will not be correlated to a position on the map corresponding to the location.

In this case, image data sets obtained at a location can be correlated to a position on a map corresponding to the location by a manual operation. However, in order to perform such correlation, a map of the location must be selected; the image data sets must be reproduced to confirm the location of photography; and the image data sets correlated to the location on the map. Therefore, the manual operation is extremely troublesome.

SUMMARY OF THE INVENTION

The present invention has been developed in view of the circumstances described above. It is the object of the present invention to facilitate correlation of image data sets and locations, during generation of albums in which the image data sets are correlated with locations on maps.

The album generation method according to the present invention is a method for generating an album based on album data including at least one image data set, which has been photographed during a trip and which has time data representing a time of photography attached thereto, comprising the steps of:

obtaining travel route data, which includes data related to the route taken during the trip and times of passage through desired positions along the route;

obtaining a map data set that contains the route from a map database which stores a plurality of map data sets, based on the travel route data;

estimating a photography location based on the travel route data and the time data;

generating photography data which represents that the image data set was obtained at the photography location along the route;

attaching the photography data to the map data set; and generating album data including the map data set, in which the photography data is correlated with the image data set.

Regarding image data sets obtained by a digital camera, data representing the photography dates and times attached thereto in tag information may be employed as the "time data". On the other hand, in the case that film, which has a magnetic recording portion capable of magnetically recording data therein, is employed, the photography dates and times can be recorded in the magnetic recording portion. Therefore, regarding image data sets obtained by scanning images recorded on film, the data representing the photography dates and times recorded on the film may be employed as the "time data".

"Travel route data" is data that represents a route taken from a reference departure point, such as the user's residence, to a final destination. The travel route data includes data related to time of passage through a desired position along the route.

"Data related to time of passage through a desired position along the route" does not necessarily refer to data that represents time of passage at every position along the route. The "data related to time of passage" includes data that enables estimation of time of passage through a specified position, in case a desired position is specified along the route. For example, if the "data related to time of passage" is only a departure time and an arrival time, if the distance between the departure point and the final destination is known, an average speed of travel along the route can be calculated. Further, if the distance between the departure point and the specified position is known, the time of passage through the specified position can be calculated, based on the distance and the average speed.

Image data sets obtained by a digital camera with a GPS function has GPS data, which represents the photography location, attached thereto. In the case that image data sets are obtained by scanning film provided with a magnetic recording portion, on which photographs are recorded by a camera equipped with a GPS function, the GPS data recorded on the film can be attached to the image data sets. In these cases, the travel route data can be obtained by employing the GPS data attached to the image data sets to trace the route of photography locations of the image data sets. Alternatively, the travel route data may be obtained by manually inputting the route taken to reach the final destination. Note that the GPS data is not limited to that obtained by a GPS means built in to the camera. The GPS data may be obtained by a separate portable GPS device, or a vehicle navigation system mounted in an automobile, then attached to the image data sets.

Note that cellular telephones receive location data, which represents their locations, from base stations. Accordingly, the travel route data may be obtained based on location data received by a cellular telephone.

In the case that the method of travel is by rail, if the departure point, the final destination, date and time of departure, and the date and time of arrival at the final destination are known, the train boarded by the user and the station at which the user got off the train can be determined. If the train boarded and the station at which the user got off are known, the times of passage through desired positions along the travel route can be determined. In the case that the method of travel is by automobile, the travel route and the times of passage through desired positions along the travel route can be determined by taking into consideration the average travel speed of automobiles. Accordingly, the travel route data may be obtained based on data regarding: the departure point; the final destination; the date and time of departure; the date and time of arrival at the final destination; and the method of travel, by employing train route search software, automobile route search software, or the like.

Alternatively, the travel route data may be obtained by combining the GPS data, the location data of the cellular telephone, and data obtained by the train route search software or the automobile route search software. For example, if GPS data is attached to an image data set, the GPS data is prioritized in the obtainment of the travel route data. However, in the case that the GPS data is not attached to an image data set due to the GPS means not being able to receive positioning electromagnetic waves from a GPS satellite, the travel route data may be obtained by employing data obtained by train route search software. Alternatively, travel route data obtained by automobile route search software, taking into consideration the average travel speed of an automobile, may be corrected by GPS data attached to image data sets to obtain more accurate travel route data.

The "map database" records therein a plurality of map data sets. The "plurality of map data sets" is not limited to data that represent maps of Japan, but may include data representing maps of each country in the world at different scales. The "plurality of map data sets" may further include data representing maps that indicate routes corresponding to various method of travel, such as by rail, by automobile, by bicycle, by ship, by plane, and on foot. As railways and roads change over time, a plurality of map data sets corresponding to different time periods may be recorded in the map database.

The "photography data" refers to data that enables one who views the album data to recognize that an image data set was obtained at the position to which the photography data is attached. Specifically, the photography data may be a line that connects a thumbnail image of an image data set with a photography location on a map, when the map and the thumbnail image are displayed together. Alternatively, the photography data may be a mark, plotted on a reduced map indicating the photography location of an image data set. The reduced map is contained within the data file of the image data set as a thumbnail image in Exif format, or attached as a thumbnail image combined with a thumbnail image of the image data set, to the image data set. As a further alternative, icons attached to the photography locations may be employed as the photography data.

"The photography data and the image data set are correlated" refers to enabling recognition of the contents of the image data set, which was photographed at the photography location. Specifically, a line may connect a thumbnail image with a photography location thereof on a map. Alternatively, the photography data may be plotted as a mark on a reduced map, which is contained within the data file of an image data set as an Exif format thumbnail image, or plotted as a mark on a reduced map in combination with a thumbnail image of the image data set, which is attached to the image data set. As a further alternative, icons may be attached to the photography locations on a map, to enable reproduction of the image data sets corresponding thereto when the icons are clicked.

The generated album data may be stored on a web site, be recorded in a writable medium such as a CD-R, DVD-R, or a memory card, be displayed on a monitor, or be immediately reproduced by being printed out.

Note that the method for generating an album according to the present invention may further comprise the steps of:

obtaining related data, which is related to the photography location; and generating album data, in which the related data is correlated with the map data set.

The "related data" may be an image data set photographed by a third party at the photography location or the vicinity thereof. The "related data" may alternatively be audio data of music or sounds distinct to the photography location or the vicinity thereof, obtained by recording at the photography location or the vicinity thereof in advance or the like. The "related data" may also be text data describing the photography location or the vicinity thereof, in the case that the photography location or the vicinity thereof is site of historic interest or the like. Note that in the case that the "related data" is an image data set photographed by a third party, it is preferable that the image data set be one that is not usually obtainable. Examples of such image data sets are: that which has been photographed by a professional photographer; an aerial photograph; and a bird's eye view photograph. In addition, the image data set is not limited to still images, and may include video data that represents moving images.

In addition, the method for generating an album according to the present invention may obtain the map data set based also on user data of a user who generates the album.

The "user data" refers to data that enables estimation of the user's preferences, such as the user's age, profession, and interests.

The album generating apparatus according to the present invention is an album generating apparatus that generates album data including at least one image data set, which has been photographed during a trip and which has time data representing a time of photography attached thereto, comprising:

travel route data obtaining means for obtaining travel route data, which includes data related to the route taken during the trip and times of passage through desired positions along the route;

map data set obtaining means for obtaining a map data set that contains the route from a map database which stores a plurality of map data sets, based on the travel route data;

photography location estimating means for estimating a photography location based on the travel route data and the time data;

photography data generating means for generating photography data which represents that the image data set was obtained at the photography location along the route;

photography data attaching means for attaching the photography data to the map data set; and album data generating means for generating album data including the map data set, in which the photography data is correlated with the image data set.

Note that in the album generating apparatus according to the present invention, the album data generating means may further obtain related data, related to the photography location, and correlate the related data to the map data set.

In addition, in the album generating apparatus according to the present invention, the travel route data obtaining means may obtain the travel route data based at least on data regarding: a departure point; a final destination; date and time of departure; date and time of arrival at the final destination; and method of travel.

Further, in the album generating apparatus according to the present invention, the map data set obtaining means may obtain the map data set based also on user data of a user who generates the album.

Note that the method for generating an album according to the present invention may be provided as a program that causes a computer to execute the method. The program may be provided on a computer readable medium.

According to the present invention, travel route data, which includes data related to the route taken during a trip and times of passage through desired positions along the route, is obtained. Then, a map data set that includes the travel route is obtained from a map database. Thereafter, a photography location is estimated for an image data set, based on the travel route data and time data, which is attached to the image data set. Further, photography data which represents that the image data set was obtained at the estimated photography location along the route is generated and attached to the map data set, and album data including the map data set, in which the photography data is correlated with the image data set, is generated.

Therefore, as long as the travel route data is obtained, image data sets are easily correlated to the photography locations thereof, along a travel route on a map, represented by the map data set. Accordingly, the image data sets and the photography locations are easily correlated, thereby enabling easy generation of album data.

In addition, related data, related to the photography locations of image data sets, may be obtained, and the album data may be generated having the related data correlated to the map data set. Thereby, data related to the photography locations of the image data set may also be included in the album data, in addition to the image data sets. Accordingly, the contents of the album can be enriched.

Further, the travel route data may be obtained based at least on data regarding: a departure point, a final destination, a date and time of departure, and a date and time of arrival at the final destination. Therefore, the travel route data can be obtained, requiring only comparatively simple input. The necessity to carry means to obtain data representing a photography location of an image data set, such as a GPS means or a cellular telephone, is obviated. Accordingly, the burden on the user is reduced in the obtainment of the travel route data.

Still further, the map data set, which includes the travel route, may be obtained based also on user data of a user who generates the album. Therefore, a map data set reflecting the preferences of the user may be obtained, and the album, represented by the album data, may more suit the user's preferences.

DESCRIPTION OF THE PREFERRED EMBODIMENTS

Figure 1:
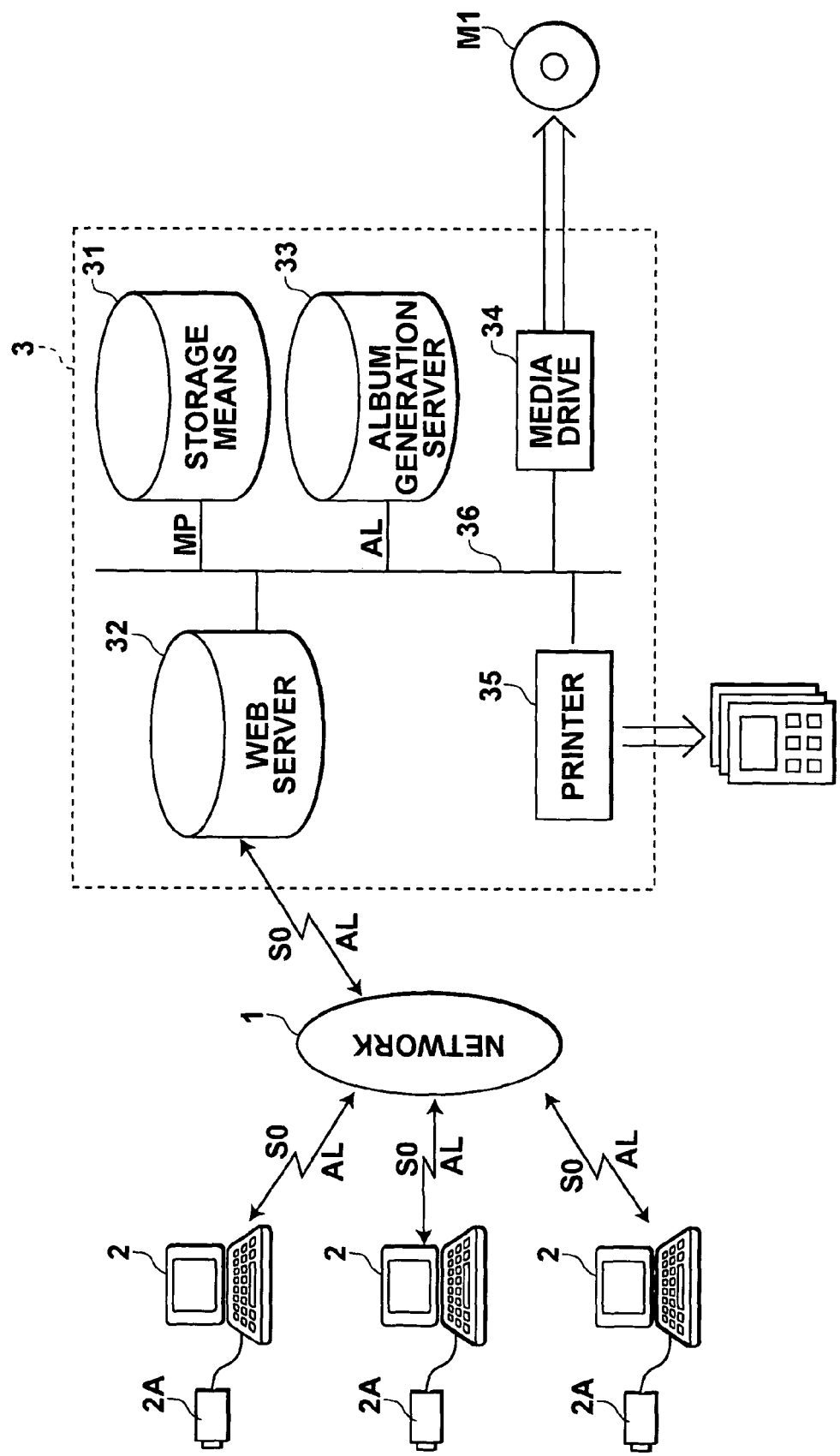
FIG. 1 is a schematic block diagram showing the construction of an album generation system in which an album generating apparatus according to an embodiment of the present invention is employed.
Figure 2:
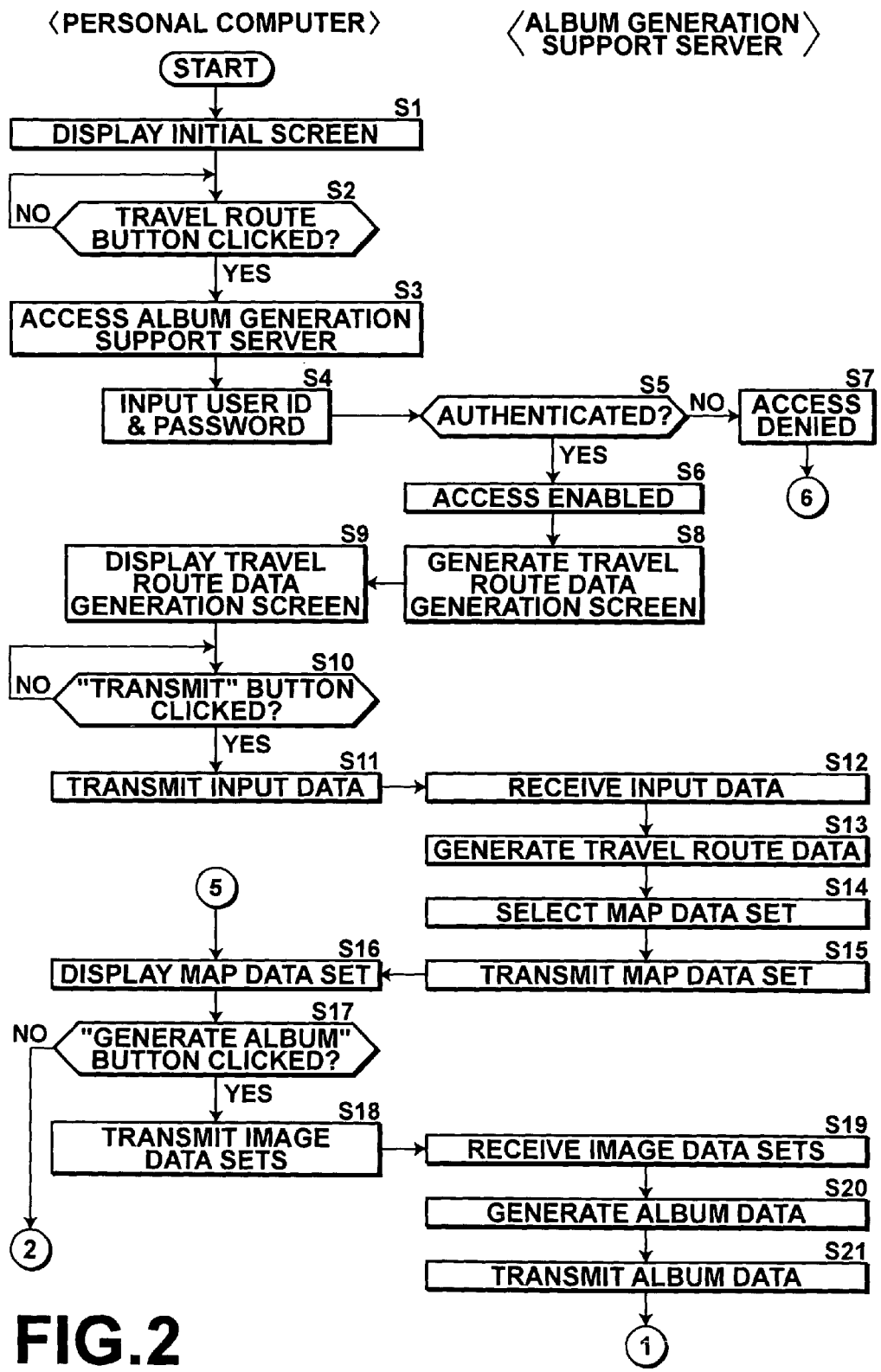
FIG. 2 is the first part of a flow chart showing the processes performed during album generation by the embodiment of FIG. 1.
Figure 3:
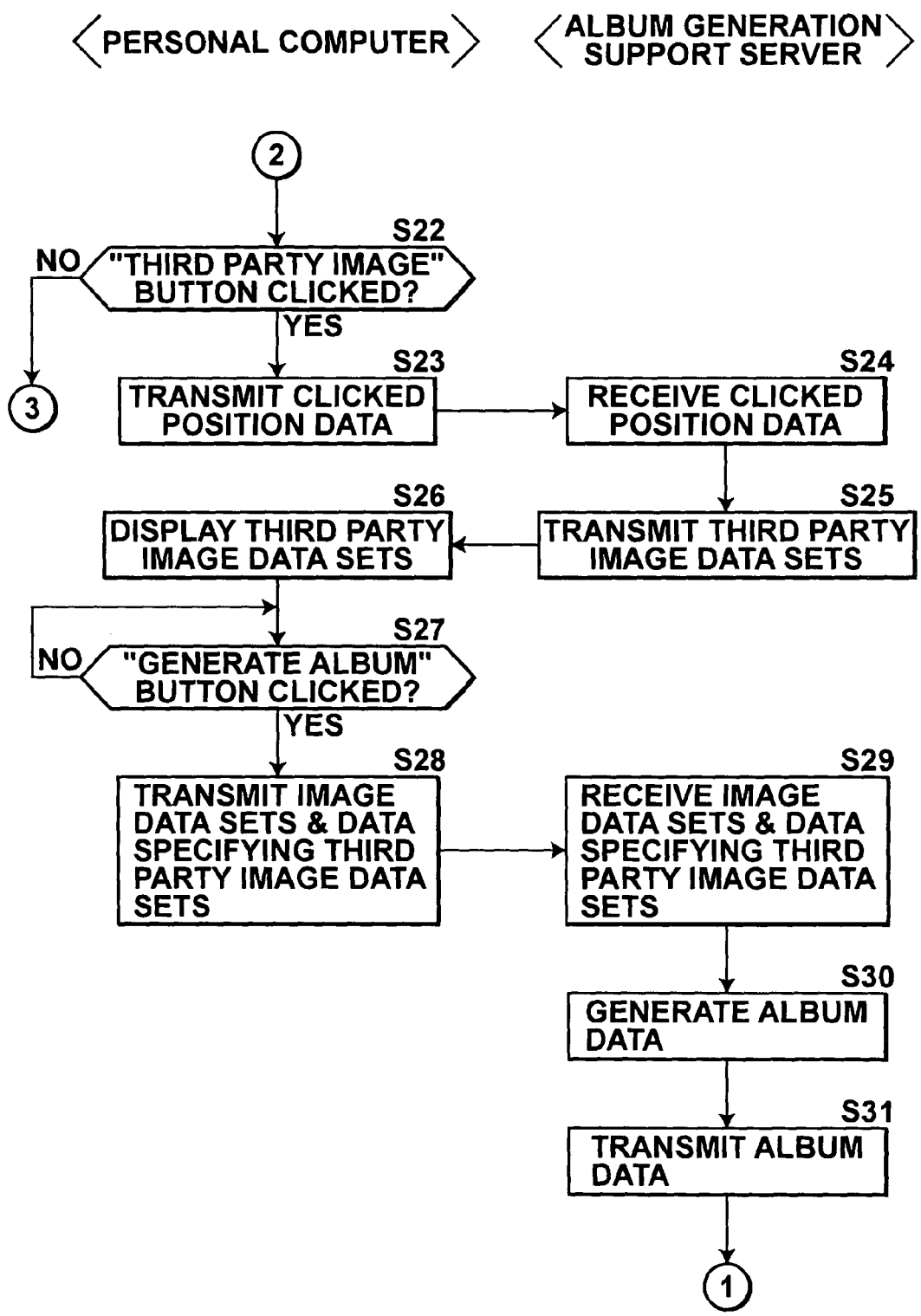
FIG. 3 is the second part of a flow chart showing the processes performed during album generation by the embodiment of FIG. 1.
Figure 4:
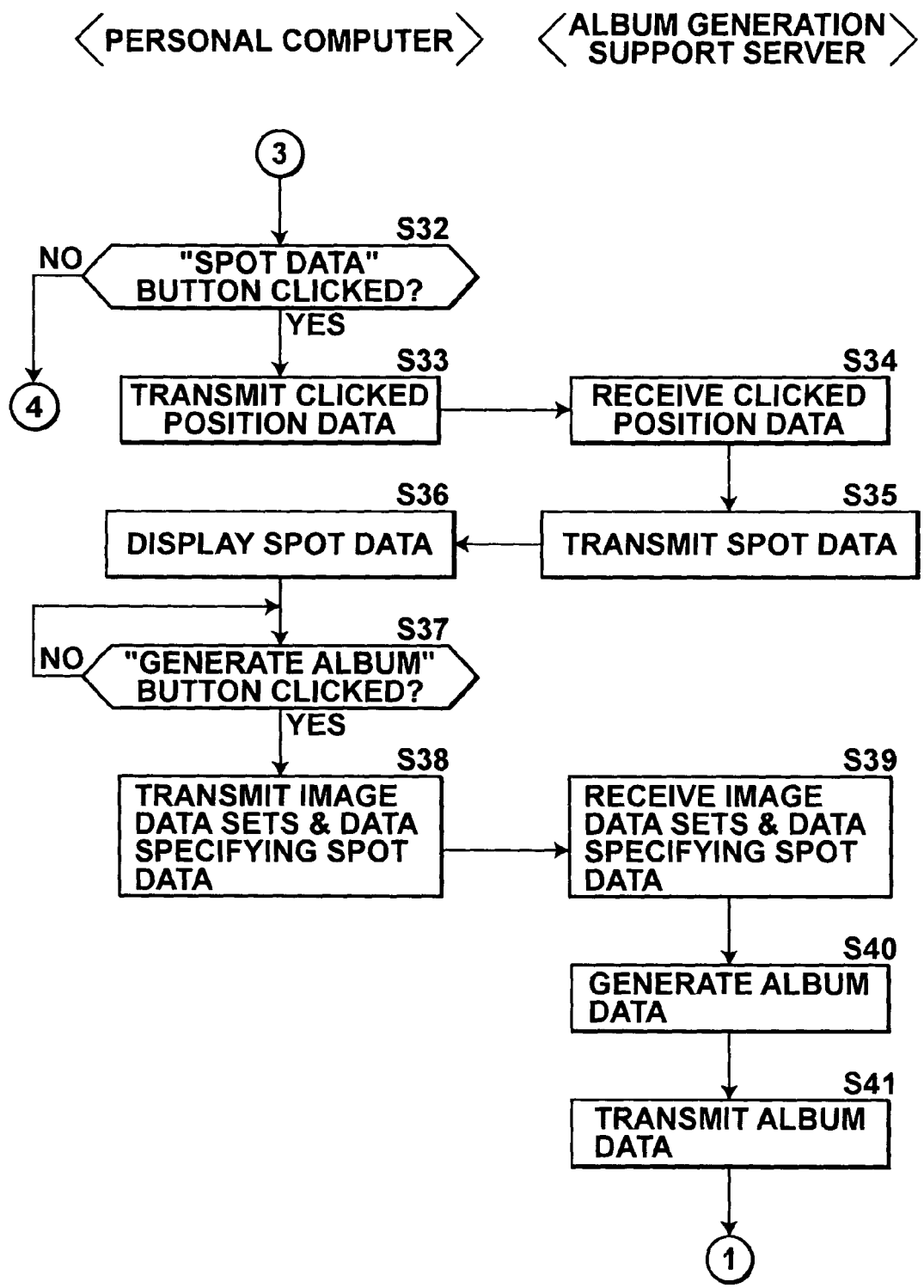
FIG. 4 is the third part of a flow chart showing the processes performed during album generation by the embodiment of FIG. 1.
Figure 5:
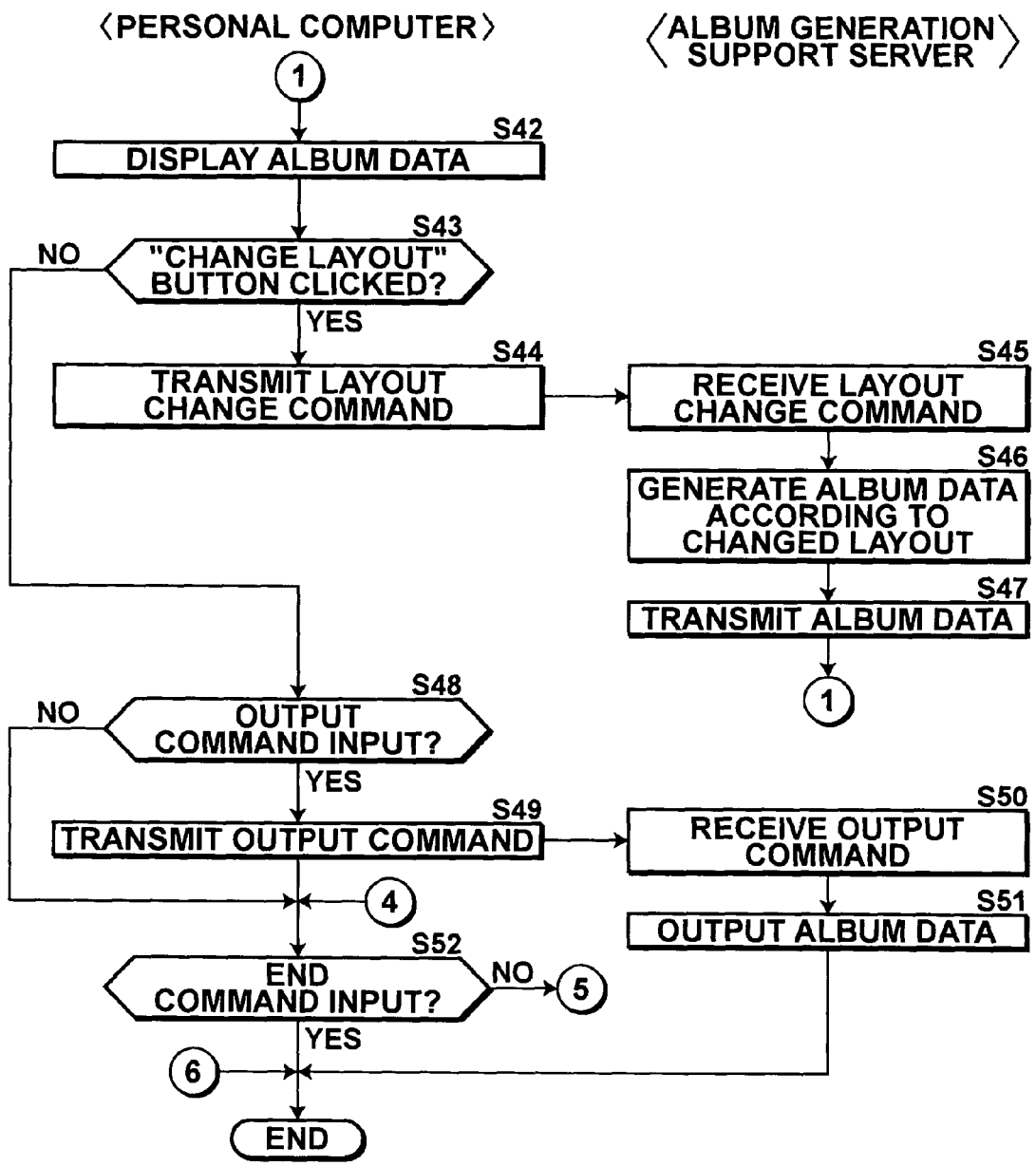
FIG. 5 is the fourth part of a flow chart showing the processes performed during album generation by the embodiment of FIG. 1.

Hereinafter, an embodiment of the present invention will be described with reference to the attached drawings. FIG. 1 is a schematic block diagram showing an album generating system employing an album generating apparatus according to an embodiment of the present invention. As shown in FIG. 1, the album generating system of the present invention comprises: a network 1, such as the Internet; a personal computer 2 of a user who desires to generate an album, for performing various procedures to generate the album as will be described later, connected to the network 1; and an album generation support server 3, for storing image data sets S0 transmitted via the network 1 and for generating the album, also connected to the network 1. Data is exchanged among the constituent components of the album generating system.

Regarding the present embodiment, a user, who went on a trip and desires to generate an album of the images photographed during the trip, transmits image data sets S0 and information necessary for album generation from the personal computer 2 to the album generation support server 3. The album generation support server 3 employs the image data sets S0 to generate album data AL, which represents the album.

Note that regarding the present embodiment, the image data sets S0 are assumed to have been photographed by a digital camera owned by the user. Here, tag information attached to the image data sets S0 include time data that represents dates and times of photography.

A card reader 2a, for reading out the image data sets S0, which have been photographed by the digital camera, from a memory card, is connected to the personal computer.

Image management software, for managing the image data sets S0, is installed in the personal computer 2. The image management software communicates with the album generation support server 3, and has a web browsing function, for displaying web pages for album generation. The user accesses a web site of the album generation support server 3 by employing the image management software. Commands for generating the album data AL are input by a function of the image management software that enables input of commands to web sites.

The album generation support server 3 comprises: a storage means 31 for storing various types of data and information, constituted by a high capacity hard disk; a web server 32 for managing the web site of the album generation support server 3, connected to the network 1; an album generation server 33 for generating the album data AL based on the image data sets S0 transmitted from the personal computer 2; a media drive 34 for recording the album data AL onto media M1, such as a CD-R or a DVD-R; a printer 35 for printing out the album data AL; and a bus 36 for connecting all of the constituent components of the album generation support server 3.

The storage means 31 has recorded therein: the image data sets S0 transmitted from the user's personal computer 2 via the network 1; various templates for laying out the image data sets S0 to generate an album; a map database DB1 for managing a plurality of map data sets MP that represent maps, to be described later; generated album data AL; user data regarding a user who accesses the album generation support server 3; train route search software, train schedules, and the like, which are necessary for the generation of travel route data, which represents travel routes, to be described later; and various types of data necessary for the album generation support server 3 to perform the processes involved in album generation and the like.

The storage means 31 also has recorded therein image data sets (referred to as "third party images" to distinguish them from the image data sets S0 photographed by the user) photographed by a professional photographer at various positions along the travel route on a map. The third party images may also be aerial photographs, bird's eye view photographs, or other image data sets not obtainable by usual photography. The third party images are provided in consideration of cases in which the user forgot to photograph certain spots along the travel route, or in cases that photography was prohibited at certain spots along the travel route. Further, the storage means 31 has recorded therein spot data, such as: text data describing various positions on the map, which are sites of historic interest or the like; and audio data of music or sounds distinct to various positions on the map, such as indigenous folk songs. Note that the third party images and the spot data are stored in the storage means 31, correlated with data representing their locations on the map (for example, latitude and longitude).

The map database DB1 has recorded therein a plurality of map data sets MP. Specifically, the plurality of map data sets MP includes map data sets MP that represent maps of Japan, as well as map data sets MP representing maps of each country in the world at different scales. The plurality of map data sets MP further include map data sets MP representing maps that indicate routes corresponding to various method of travel, such as by rail, by automobile, by bicycle, by ship, by plane, and on foot. As railways and roads change over time, a plurality of map data sets MP corresponding to different time periods are recorded in the map database DB1. Further, map data sets MP that clearly indicate train routes, highways, hiking trails, and the like are recorded in the map database DB1. These map data sets MP are provided so as to enable the preferences of a user that desires generation of album data AL to be reflected in the album data AL.

The user data includes: the user's name; a user ID; a password; the user's address; the user's telephone number; the user's age; and the user's profession. The user data further includes the user's interests (for example, road trips, travel by rail, travel abroad). The user data enables estimation of the user's preferences. Here, the user data is that which has been input by the user and transmitted from the personal computer 2 to the album generation support server 3, during registration of the user with the album generation support server 3.

Note that in case a user attempts to access the album generation support server 3, user authentication is performed by prompting the user for a user ID and a password. Access to the album generation support server 3 is permitted only for authenticated users.

The web server 32 manages the web site of the album generation support server 3. The web server 32 also generates a web page to be displayed at the personal computer 2 during generation of album data AL, and transmits the web page to the personal computer 2. The web page serves as an interface to enable the user to perform: selection of image data sets S0 for generating the album data AL; transmission of the image data sets S0 to the album generation support server 3; input of information necessary for generating the album data AL; and the like. The web page also displays the generated album data AL. The web server 32 also performs authentication of users who access the album generation support server 3.

The album generation server 33 generates album data AL based on commands from the personal computer 2. Note that the processes performed by the album generation server 33 will be described later.

The media drive 34 records the generated album data AL onto various types of media M1, such as CD-R's, DVD-R's, and memory cards.

The printer 35 prints out the generated album data AL as albums. The printed albums are bound and given to the user.

Next, the processes performed by the present embodiment will be described. FIG. 2 through FIG. 5 are flow charts showing the processes performed by the present embodiment during generation of album data AL. Note that it is assumed that the user has imported image data sets S0, which have been photographed by the digital camera, into the personal computer 2, from the card reader 2a. In addition, it is assumed that the user is running the image management software on the personal computer 2, and that generation of album data AL is performed by accessing the album generation support server 3 via the image management software.

Figure 6:
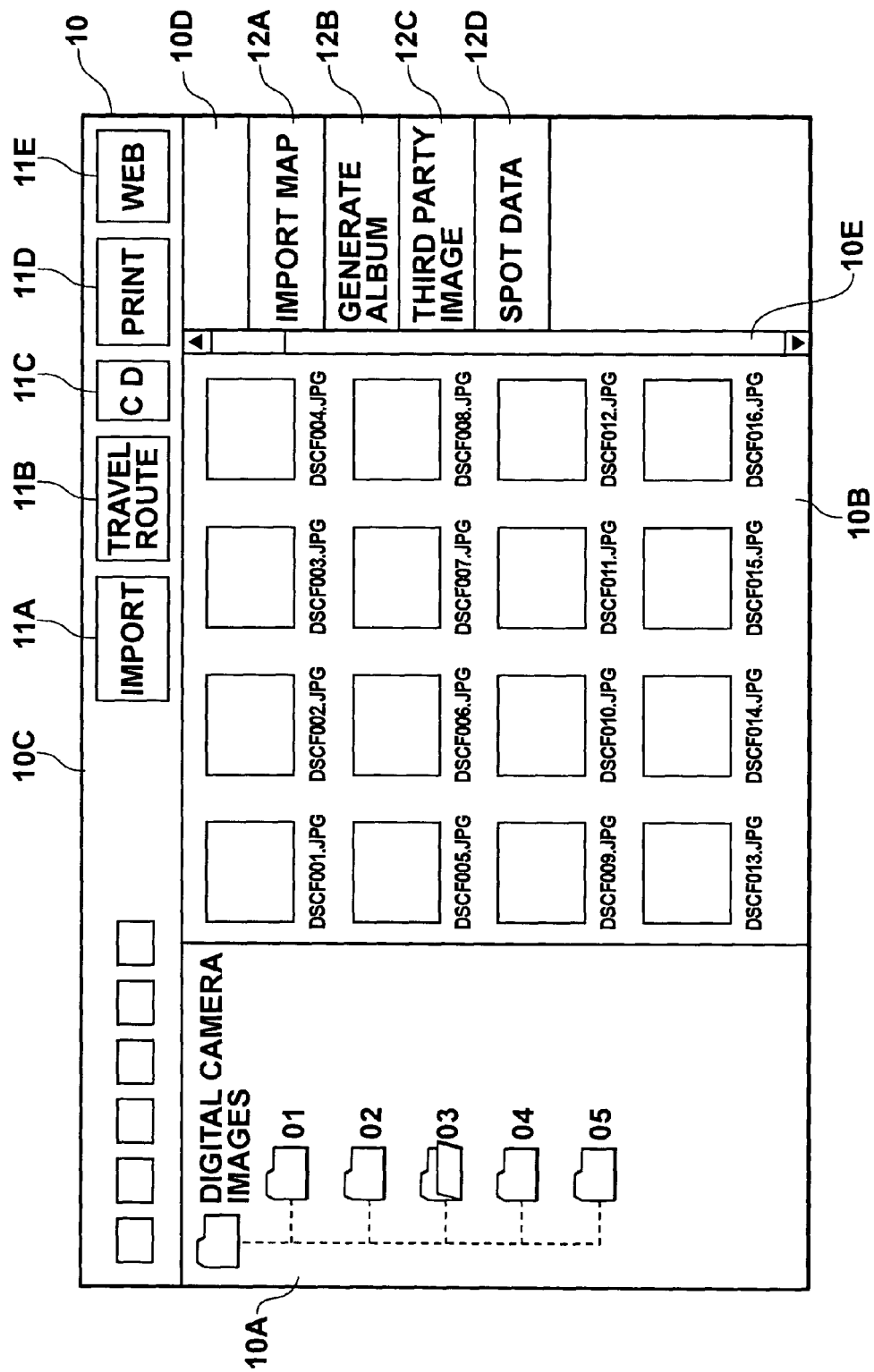
FIG. 6 shows an initial screen of image management software.

First, an initial screen is displayed at the personal computer 2 (step S1). FIG. 6 is a view of the initial screen of the image management software, displayed at the personal computer 2. As shown in FIG. 6, the initial screen 10 comprises: a folder frame 10A in which folders, which are storage locations of the image data sets S0, are displayed; a thumbnail image frame 10B in which thumbnail images of the image data sets S0, which are stored in a selected folder, are displayed; an operation frame 10C in which various operation buttons are displayed; and a command frame 10D in which various command buttons for inputting commands to the album generation support server 3 are displayed. Note that in the initial screen 10 shown in FIG. 6, a state is shown wherein folder 03, from among digital camera image folders 01 through 05 stored in the personal computer 2, is selected.

File names of the image data sets S0 corresponding to the thumbnail images are displayed along with the thumbnail images of the image data sets S0 stored in the selected folder in the thumbnail image frame 10B. In this state, if a thumbnail image is double clicked by use of a mouse (not shown) of the personal computer 2, the image data set S0 corresponding thereto is enlarged and displayed in a separate window. In addition, if a thumbnail image is single clicked, the thumbnail image can be selected. The selection state is displayed by inverting the display of the thumbnail image, changing the color of the border thereof, or the like. Note that a scroll bar 10E is provided in the thumbnail image frame 10B. In case that the thumbnail images of all of the image data sets S0 stored in the selected folder are not displayed in the thumbnail image frame 10B, the thumbnail image frame 10B can be scrolled by use of the scroll bar 10E. Thereby, the thumbnail images of all of the image data sets S0 stored in the selected folder can be displayed.

Various types of buttons are displayed in the operation frame 10C. However, only the buttons employed in album generation will be described here. An "import" button 11A is clicked when image data sets S0 are to be imported to the personal computer 2 from a memory card inserted in the card reader 2a, or from a digital camera connected to the personal computer 2. A "travel route" button 11B is clicked when importing a map data set MP during generation of travel route data, as will be described later. A "CD" button 11C is clicked when an order to record generated album data AL onto a medium M1 is to be placed with the album generation support server 3. A "print" button 11D is clicked when placing an order for printout and binding of generated album data AL with the album generation support server 3. A "web" button 11E is clicked when generated album data AL is to be stored in the album generation support server 3 and displayed as a web page.

An "import map" button 12A, to be clicked when importing a map data set MP to the personal computer 2; a "generate album" button 12B, to be clicked when inputting a command to generate album data AL; a "third party image" button 12C, to be clicked when attaching image data sets photographed by a third party to album data AL, as will be described later; and a "spot data" button 12D, to be clicked when attaching spot data related to a location where an image data set S0 was photographed to album data AL, are displayed in the command frame 10D.

Note that the "import map" button 12A is clicked when a map data set MP is to be obtained with reference to location data attached to an image data set S0, in the case that an album is generated employing image data sets S0 having location data representing photography locations thereof attached thereto. The example of album generation to be described in the present embodiment is that in which travel route data is generated by the album generation support server 3, and a map data set MP is obtained based on the generated travel route data, as will be described later. Therefore, the "import map" button 12A will not be utilized in the present embodiment.

In the case that the digital camera that the image data sets S0 has been photographed by is equipped with a GPS means for receiving GPS data, the GPS data obtained by the GPS means, representing latitudes and longitudes of the photography locations, are attached to the image data sets S0. Alternatively, there are cases in which a cellular telephone is connected to a digital camera, data representing the location of the cellular telephone, transmitted from a base station of a cellular network, is input to the digital camera. In this case also, the location data is attached to the image data sets S0.

There are cases that image data sets S0 are obtained by scanning images recorded on film capable of recording magnetic information thereon. In this case, a camera may be provided with a GPS means or a function of obtaining location data from a cellular phone. The location data obtained by the camera may be recorded on a magnetic recording portion of the film, to be readout simultaneously with the scanning of the images, thereby attaching the location data to the scanned image data sets S0.

The user selects a folder that contains the image data sets S0 for generating album data AL from among the folders displayed in the folder frame 10A of the initial screen 10. Then, thumbnail images of the image data sets S0 stored in the selected folder are displayed in the thumbnail image frame 10B.

In this state, monitoring is initiated to judge whether the travel route button 11B is clicked (step S2). If the judgment in step S2 is affirmative, the personal computer 2 accesses the album generation support server 3 (step S3). Then, an authentication screen (not shown) that prompts the user to input a user ID and a password is displayed, and a user ID and a password are input (step S4). The web server 32 of the album generation support server 3 judges whether the user has been authenticated (step S5). If the judgment in step S5 is affirmative, access is enabled (step S6), and the following processes are performed. If the judgment in step S5 is negative, access is denied (step S7), and the process ends.

If access is enabled, a web page that represents a travel route data generation screen, for prompting input of data necessary to generate travel route data, is generated by the web server 32 (step S8). The travel route data generation screen is displayed at the user's personal computer 2 (step S9).

Figure 7:
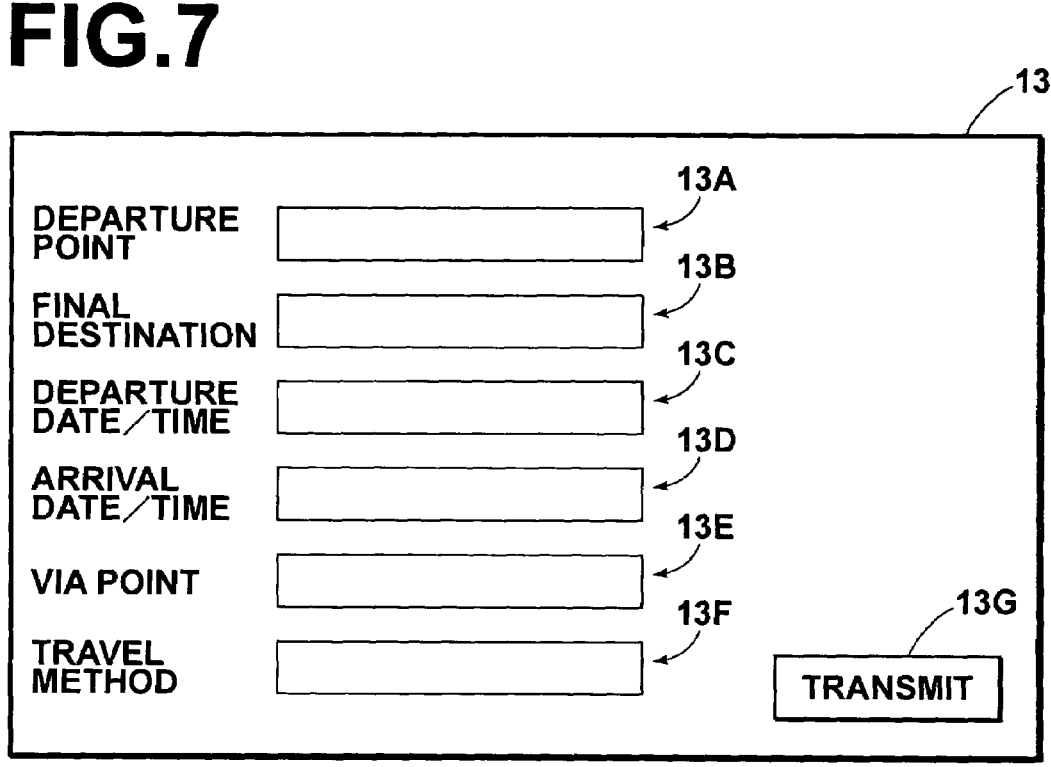
FIG. 7 shows a travel route data generation screen.

FIG. 7 shows the travel route data generation screen 13. As shown in FIG. 7, a "departure point" input box 13A for the user to input the departure point of a trip; a "final destination" input box 13B for the user to input the final destination of the trip; a "departure date/time" input box 13C for the user to input the date and time of departure; an "arrival date/time" input box 13D for the user to input the date and time of arrival at the final destination; a "via point" input box 13E for the user to input a point traveled through, if necessary; a "travel method" input box 13F for the user to input the method of travel; and a "transmit" button 13G for transmitting the input data to the album generation support server 3, are displayed on the travel route data generation screen 13.

The user inputs the departure point, the final destination, the date and time of departure, the date and time of arrival, a point traveled through, and the method of travel into the input boxes 13A, 13B, 13C, 13D, 13E, and 13F, respectively. Note that as the method of travel, various travel methods, such as "on foot", "by rail", "by automobile", "by ship", and "by airplane", etc. may be input. As methods of travel are limited, a plurality of travel method may be displayed, each with a check box. The method of travel may be input by checking one of the plurality of check boxes.

In addition to the items listed above, data such as that describing traffic conditions (e.g., "light traffic", "heavy traffic") in case that the method of travel is by automobile, may be input.

After the travel route data generation screen 13 is displayed, monitoring is initiated to judge whether the "transmit" button 13G is clicked (step S10). When the judgment in step S10 is affirmative, the data input at the travel route data generation screen 13 is transmitted to the album generation support server 3 (step S11).

The album generation support server 3 receives the data which has been input at the travel route data generation screen 13 (step S12). This data is input to the album generation server 33, which generates the travel route data (step S13).

In the case that the method of travel is "by rail", if the departure point, the final destination, date and time of departure, and the date and time of arrival at the final destination are known, the train boarded by the user, the station at which the user boarded the train, and the station at which the user got off the train can be determined. The determination is made by employing train route search software, which is stored in the storage means 31. If the train boarded, the station at which the user boarded the train, and the station at which the user got off are known, the times of passage through desired positions along the travel route can be determined. In the case that the method of travel is "by automobile" and the departure point, the final destination, date and time of departure, and the date and time of arrival at the final destination are known, the travel route and the times of passage through desired positions along the travel route can be determined by taking into consideration the average travel speed of automobiles.

The album generation server 33 generates travel route data representing the travel route of the user by performing calculations employing software, train schedules and the like stored in the storage means 31, based on the input data.

For example, if the travel method is "by rail", the departure point is Tokyo station, the final destination is Morioka, the date and time of departure is Jul. 11, 2001 at 8:46 AM, and the date and time of arrival is Jul. 11, 2001 at 5:00 PM, then the travel route is the Northeast bullet train between Tokyo and Morioka. Because the train boarded by the user is determinable to a degree, times of passage at specified positions along the travel route can be calculated by referring to a train schedule. The travel route data is necessary in the calculation of positions that exist along the rails of the Northeast bullet train, as well as in the calculation of times of passage therethrough by the user. Note that in case the "via point" is a major train station along the travel route, the times of passage may also be calculated by employing the time of passage through the major train station. Therefore, the time of passage through the major train station may also be included in the travel route data.

As another example, if the travel method is "on foot", the departure point is the base of Mount Fuji, the final destination is the peak of Mount Fuji, the date and time of departure is Aug. 11, 2002 at 11 AM, and the date and time of arrival is Aug. 12, 2002 at 4 AM, then the travel route is the hiking trail of Mount Fuji. If the distance of the hiking route of Mount Fuji is known, then the travel speed of the user can be determined from the departure date and time and the arrival date and time. Therefore, times of passage through desired points along the travel route can be calculated. The travel route data is necessary in the calculation of positions that exist along the hiking trail of Mount Fuji, as well as in the calculation of times of passage therethrough by the user.

After the travel route data is generated in this manner, a map data set MP that includes the travel route represented by the generated travel route data is selected from the map data base DB1, which is stored in the storage means 31 (step S14). At this time, user data of the user who is accessing the album generation support server 3 may be referenced, to select a map data set MP that reflects the preferences of the user.

A map data set MP of a scale that maximally displays the user's travel route is selected. Note that a region that maximally displays the user's travel route may be cut out from map data which is stored in the storage means 31, and employed as the map data set MP, as necessary. In addition, map data sets MP of different time periods are stored in the storage means 31. Therefore, a map data set MP corresponding to the time period during which the image data sets S0 were photographed is selected, based on the time data attached to the image data sets S0.

The selected map data MP is transmitted to the personal computer 2 (step S15), and displayed at the personal computer 2 (step S16).

Figure 8:
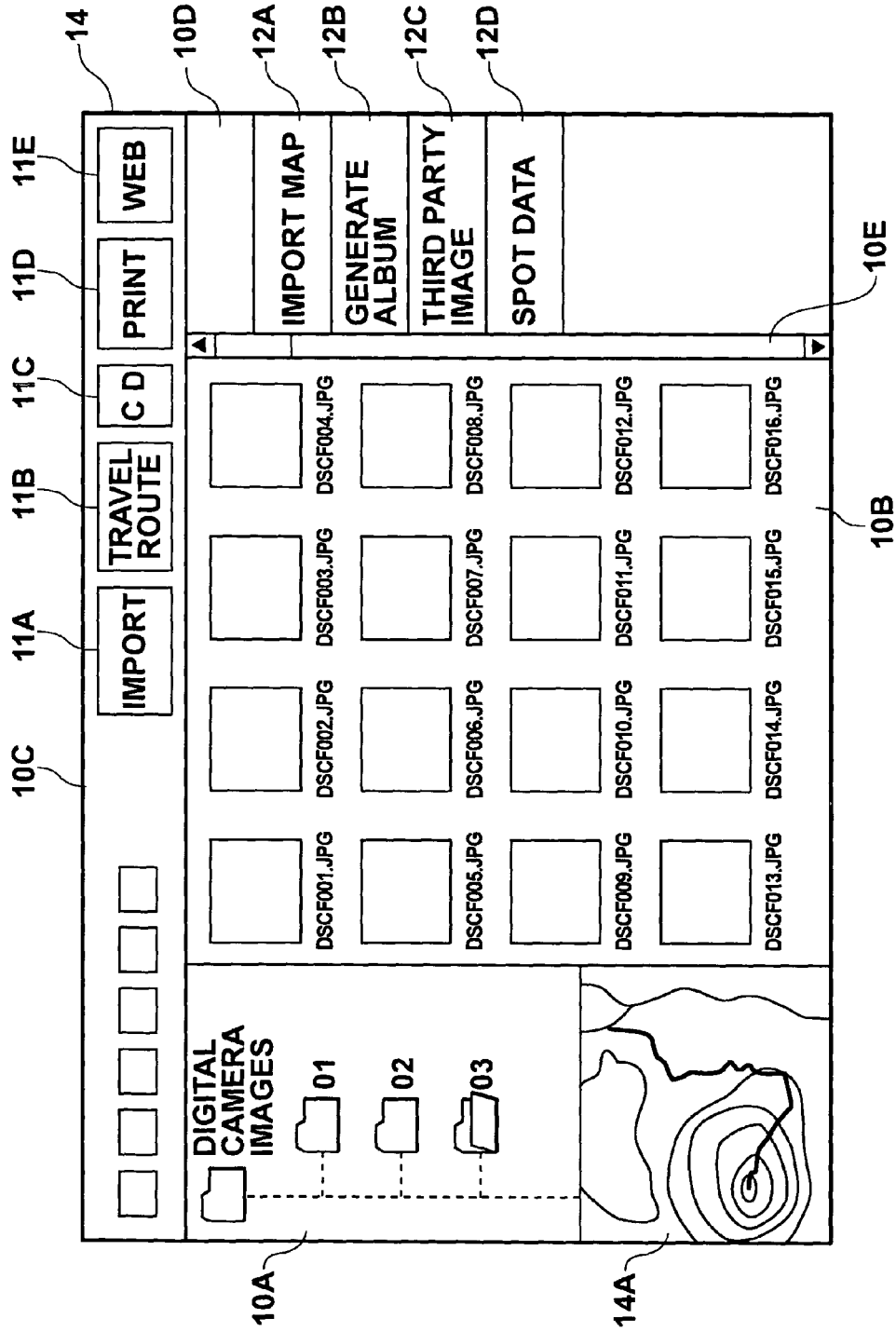
FIG. 8 shows a map display screen.

FIG. 8 shows a map display screen 14. As shown in FIG. 8, the map display screen 14 differs from the initial screen 10 in that a map frame 14A is provided beneath the folder frame 10A. The map data set MP which has been transmitted from the album generation support server 3 is displayed in the map frame 14A. Note that the travel route is indicated by, for example, a bold line on the map displayed in the map frame 14A. Thereby, the user can confirm the map data set MP which is to be utilized in the generation of album data AL.

The user selects image data sets S0 to be included in the album data AL. Then, monitoring is initiated to judge whether the "generate album" button 12B is clicked (step S17). If the judgment in step S17 is affirmative, the selected image data sets S0 are transmitted to the album generation support server 3 (step S18).

The image data sets S0 are received at the album generation support server 3 (step S19). The album generation server 33 generates album data AL based on the image data sets S0 and the map data set MP (step S20). Specifically, the album data AL is generated by arranging the image data sets S0 and the map data set MP on a predetermined template.

Note that because time data, representing the date and time of photography, is attached to the image data sets S0, a map data set MP may be selected for each date, and the album data AL may be generated with the image data sets S0 organized by the date of photography.

The generated album data AL is transmitted to the personal computer 2 as a web page (step S21).

On the other hand, if the judgment in step S17 is negative, it is judged whether the user has clicked a desired position on the map, then clicked the "third party image" button 12C (step S22). If the judgment in step S22 is affirmative, data regarding the position clicked on the map (referred to as "clicked position data") is transmitted to the album generation support server 3 (step S23).

The clicked position data is received at the album generation support server 3 (step S24). Third party image sets corresponding to the position clicked on the map are read out from the storage means 31 and transmitted to the personal computer 2 (step S25). Note that at this time, the transmitted third party image sets need only to be of a size that enables the user to confirm the contents thereof. Therefore, thumbnail images of the third party image data sets may be transmitted to the personal computer 2 for display thereat, as will be described later.

Note that a desired region on the map may be selected, the data regarding the selected region transmitted to the album generation support server 3, and third party image data sets corresponding to the selected region read out from the storage means 31 to be transmitted to the personal computer 2. The selection of the region may be performed by a click and drag operation of a mouse, or by clicking a central position, then specifying a radius therearound.

Figure 9:
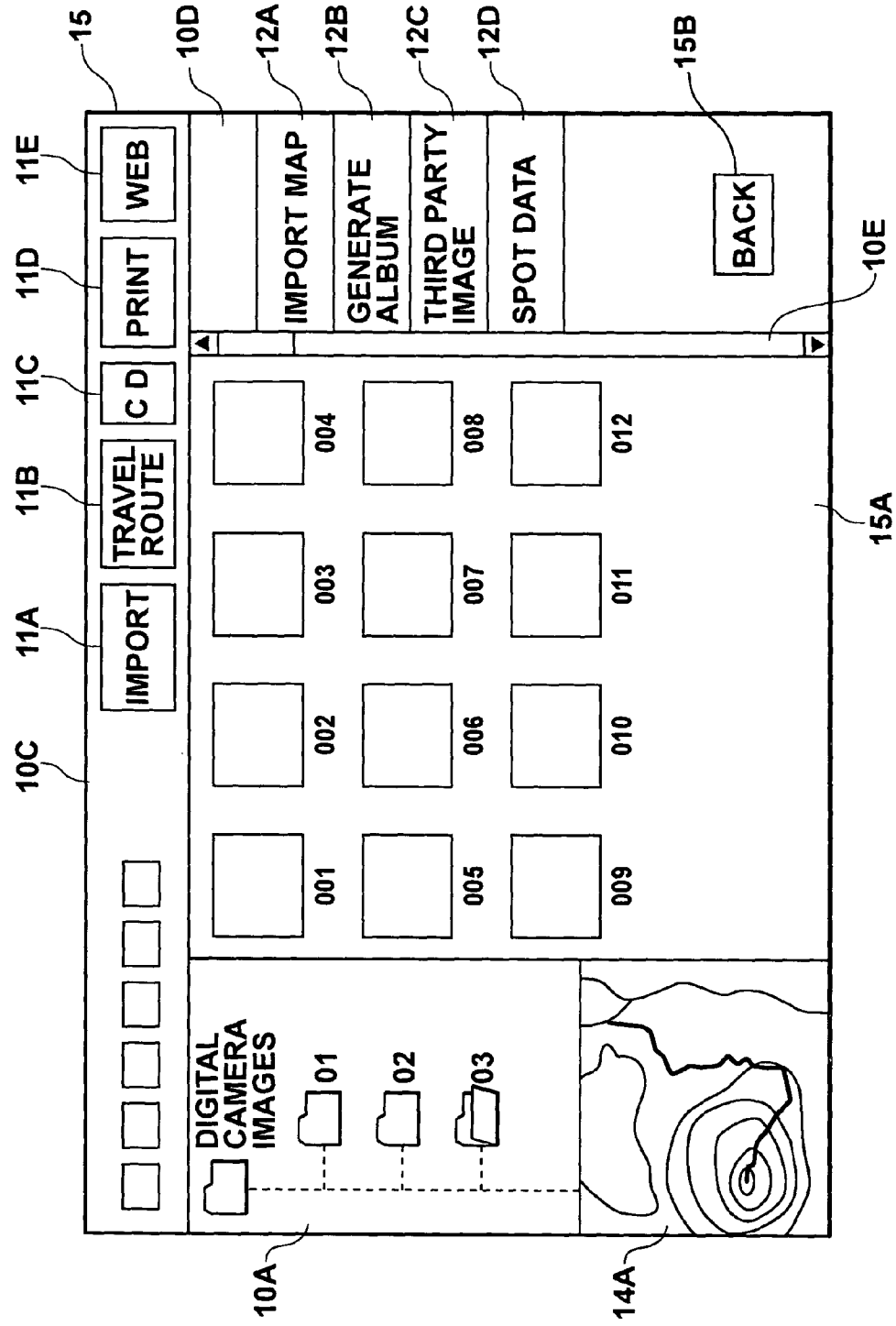
FIG. 9 shows a third party image screen.

The third party image data sets are displayed at the personal computer 2 (step S26). FIG. 9 shows a third party image display screen 15. As shown in FIG. 9, the third party image display screen 15 differs from the map display screen 14 in that a third party image thumbnail display frame 15A is displayed instead of the thumbnail image frame 10B, and that a "back" button 15B for returning to the map display screen 14 is provided at the bottom of the command frame 10D.

Third party image data sets that the user desires to include in the album may be selected by clicking the thumbnail images of the third party image data sets at the third party image display screen 15. At this time, a plurality of third party image data sets may be selected. Then, monitoring is initiated to judge whether the "generate album" button 12B has been clicked (step S27). If the judgment is step S27 is affirmative, data specifying the selected third party image data sets (for example, the file names of the selected third party image data sets) is transmitted to the album generation support server, along with the image data sets S0 (step S28). Note that the user may return to the map display screen 14 without selecting any third party image data sets, by clicking on the "back" button 15B.

The album generation support server 3 receives the image data sets S0 and the data specifying the selected third party image data sets (step S29). The album generation server 33 reads out the third party image data sets selected by the user from the storage means 31 then generates album data AL based on the image data sets S0, the third party image data sets, and the map data set MP (step S30). The generated album data AL is transmitted to the personal computer 2 as a web page (step S31).

On the other hand, if the judgment in step S22 is negative, it is judged whether the user has clicked a desired position on the map, then clicked the "spot data" button 12D (step S32). If the judgment in step S32 is affirmative, data regarding the position clicked on the map (referred to as "clicked position data") is transmitted to the album generation support server 3 (step S33).

The clicked position data is received at the album generation support server 3 (step S34). Spot data corresponding to the position clicked on the map are read out from the storage means 31 and transmitted to the personal computer 2 (step S35).

Figure 10:
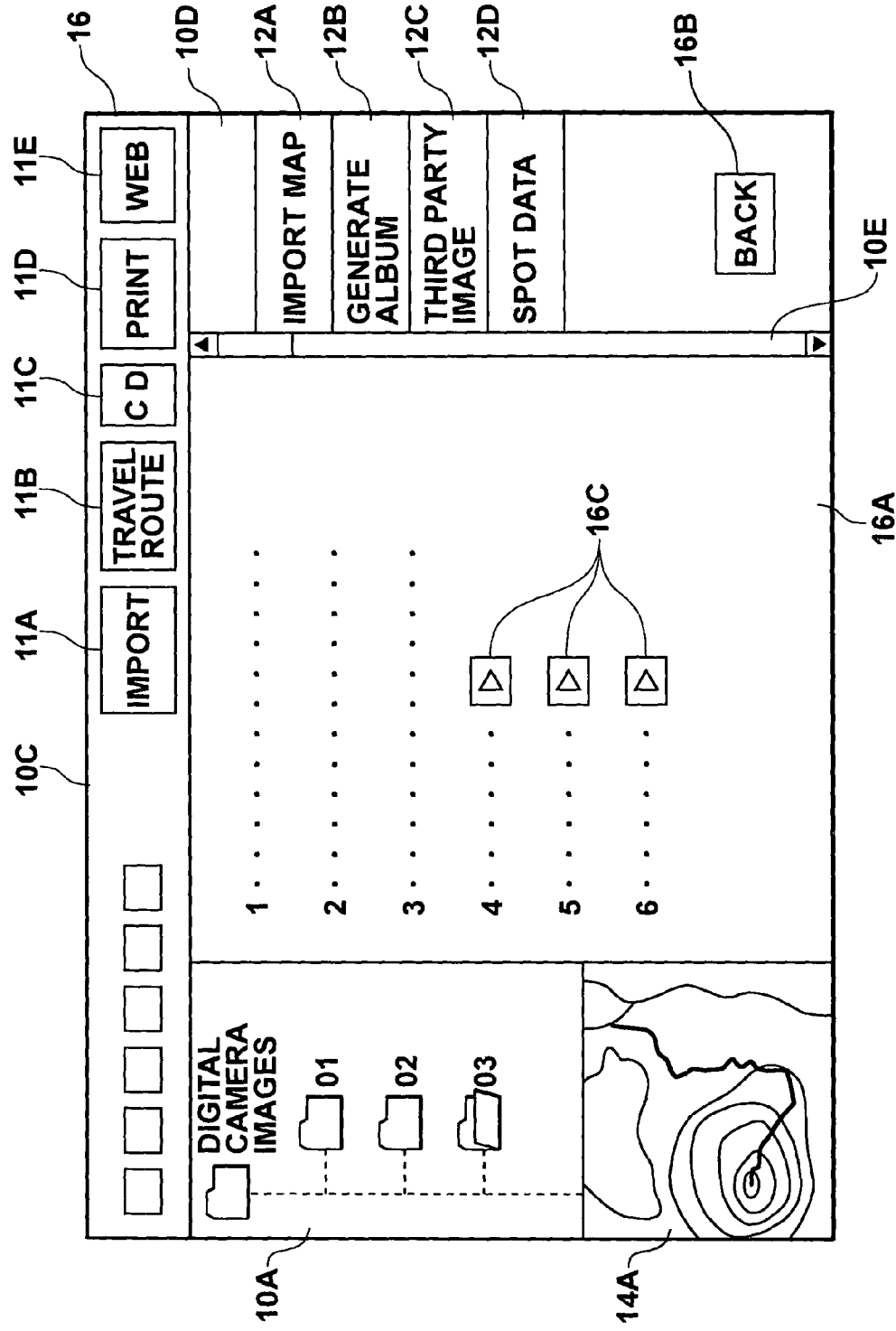
FIG. 10 shows a spot data display screen.

The spot data is displayed at the personal computer 2 (step S36). FIG. 10 shows a spot data display screen 16. As shown in FIG. 10, the spot data display screen 16 differs from the map display screen 14 in that a spot data display frame 16A is displayed instead of the thumbnail image frame 10B, and that a "back" button 16B for returning to the map display screen 14 is provided at the bottom of the command frame 10D. A plurality of spot data sets, each labeled with a number, is displayed in the spot data display frame 16A.

In the case that the spot data set is audio data, a "play" button 16C is displayed along with the number and a description of the spot data set. The user may reproduce the audio data by clicking the "play" button 16C.

Spot data sets that the user desires to include in the album may be selected by clicking the numbers of the spot data sets at the spot data display screen 15. At this time, a plurality of spot data sets may be selected. Then, monitoring is initiated to judge whether the "generate album" button 12B has been clicked (step S37). If the judgment is step S37 is affirmative, data specifying the selected spot data sets (for example, the numbers of the spot data sets) is transmitted to the album generation support server, along with the image data sets S0 (step S38). Note that the user may return to the map display screen 14 without selecting any third party image data sets, by clicking on the "back" button 16B.

The album generation support server 3 receives the image data sets S0 and the data specifying the selected spot data sets (step S39). The album generation server 33 reads out the spot data sets selected by the user from the storage means 31 then generates album data AL based on the image data sets S0, the spot data sets, and the map data set MP (step S40). The generated album data AL is transmitted to the personal computer 2 as a web page (step S41).

Figure 11:
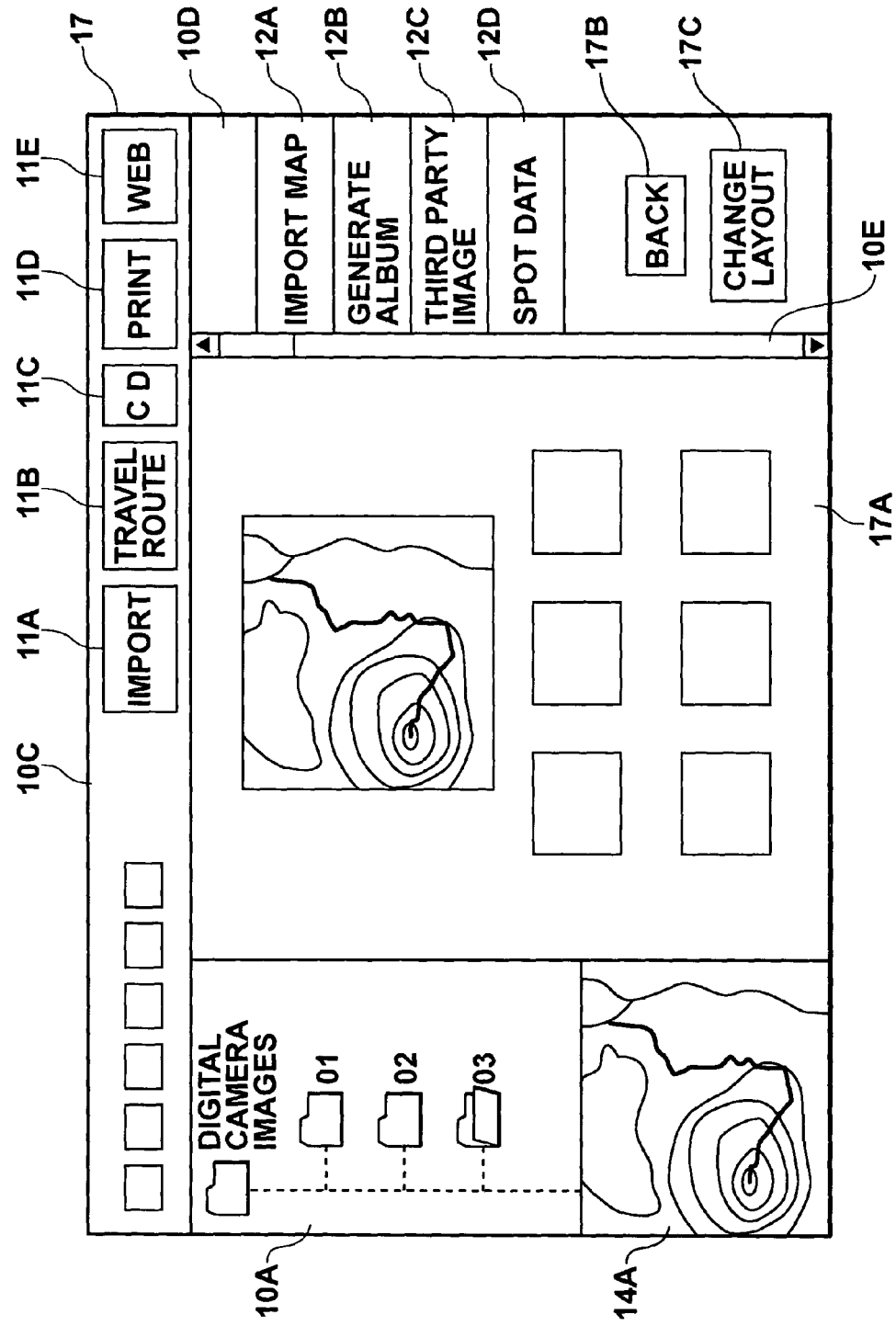
FIG. 11 shows an album display screen.

The album data AL, which has been transmitted to the personal computer 2 is displayed in an album display screen (step S42). FIG. 11 shows the album display screen 17. As shown in FIG. 11, the album display screen 17 differs from the map display screen 14 in that an album display frame 17A, in which an album represented by the album data AL is displayed, is displayed instead of the thumbnail image frame 10B, and that a "back" button 17B for returning to the map display screen 14 as well as a "change layout" button 17C for changing the layout of the album are provided at the bottom of the command frame 10D.

Figure 12:
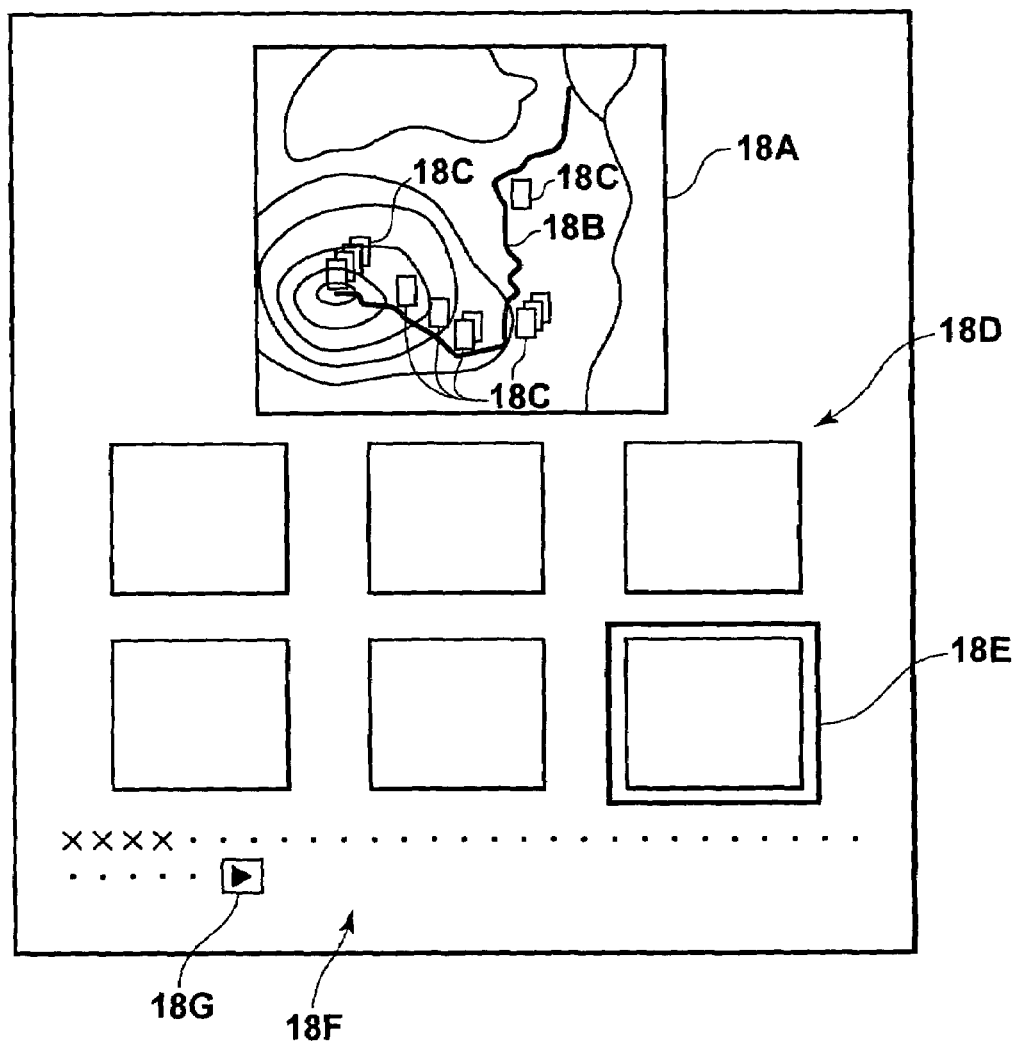
FIG. 12 shows the detailed layout of an album displayed in an album display frame.

FIG. 12 shows the detailed layout of the album displayed in the album display frame 17A. As shown in FIG. 12, in the album displayed in the album display frame 17A, a travel route 18B of the user is indicated by a bold line on a map 18A, and icons 18C that represent photography locations of the image data sets S0 are attached along the travel route 18B. Note that one type of icon 18c is attached at positions on the map to which a single image data set S0 is correlated, and another type of icon 18c is attached at positions on the map to which a plurality of image data sets S0 are correlated.

Note that as the user generally travels along the travel route 18B in both the outward and homeward directions, the color of the travel route 18B displayed on the map 18A, as well as that of the icons 18C attached may be different for the outward leg and the homeward leg of the trip.

The correlation between the positions on the travel route 18B and the image data sets S0 is performed by: calculating the user's travel speed based on the departure date and time, the arrival date and time, and the distance of the travel route 18B; calculating the distance traveled from the departure point at a date and time of photography, based on the user's travel speed and the time data attached to the image data set S0; and setting a point on the travel route 18B at the calculated distance from the departure point as the position at which the image data set S0 was photographed.

When the user clicks on an icon 18C on the map 18A, thumbnail images 18D of the image data sets S0 correlated with the position of the clicked icon 18C are displayed below the map 18A. Note that in the case that the user has input commands to include third party image data sets or spot data in the album data AL, thumbnail images 18E of the third party image data sets and spot data 18F are displayed along with the thumbnail images 18D. In the case that the spot data is audio data, a "play" button 18G is displayed. In order to distinguish the thumbnail images 18E of the third party image data sets from the image data sets S0, which have been photographed by the user, the borders of the thumbnail images 18E are of a different color than that of the thumbnail images 18D of the image data sets S0. When a different icon 18C on the map 18A is clicked, the display of the thumbnail images 18D is switched to that of the image data sets S0, the third party image data sets, and the spot data correlated with the position of the newly clicked icon 18C.

The user may return to the map display screen 14, the third party image display screen 15, or the spot data display screen 16 without performing processes such as output of the album data AL, by clicking the "back" button 17B.

Meanwhile, it is judged whether the "change layout" button 17C has been clicked (step S43). If the judgment in step S43 is affirmative, a layout change command is transmitted to the album generation support server 3 (step S44).

The album generation support server 3 receives the layout change command (step S45), and album data AL is generated based on a new layout (step S46). That is, album data AL of a different layout than that shown in FIG. 12 is generated, by changing the template on which the image data sets S0, the map data set MP, the third party image data sets and/or the spot data are arranged.

Figure 13:
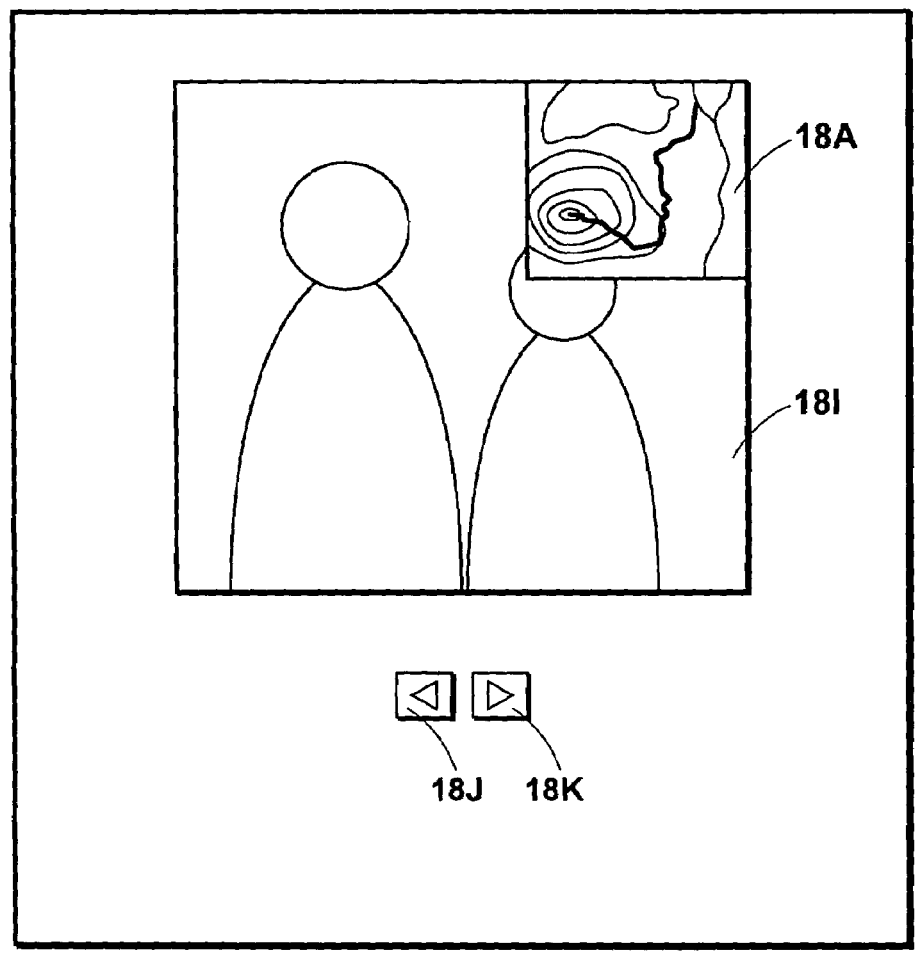
FIG. 13 shows an album having a different layout.
Figure 14:
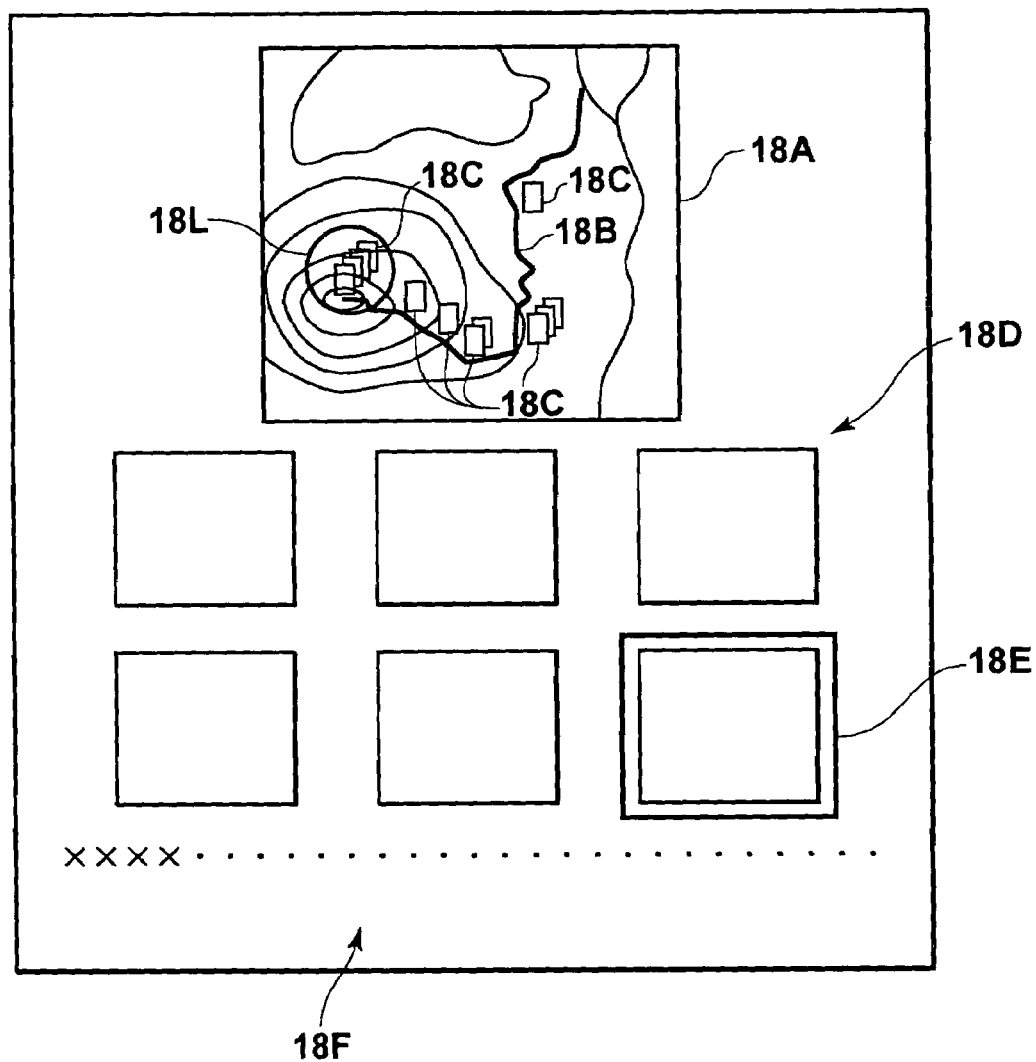
FIG. 14 shows the layout of a printed album.

For example, album data AL representing an album having the layout shown in FIG. 13 is generated. In the layout shown in FIG. 13, the map 18A is displayed at a portion of a single image 18I. Images corresponding to different positions on the map 18A are displayed by switching the specified position on the map 18A by clicking arrow buttons 18J and 18K.

The regenerated album data AL is transmitted to the personal computer 2 (step S47). The process returns to step S42, and the processes thereafter are performed.

If the judgment in step S43 is negative, it is judged whether an output command has been input for the album data AL, by the user clicking one of the "CD" button 11C, the "print" button 11D, or the "web" button 11E (step S48). If the judgment in step S48 is affirmative, an output command is transmitted to the album generation support server 3 (step S49).

The album generation support server 3 receives the output command (step S50), and the album data AL is output according to the output command (step S51). That is, in the case that the "CD" button 11C was clicked, the album data AL is recorded onto a medium M1 by the media drive 34. In the case that the "print" button 11D was clicked, the album data AL is printed by the printer 35, and bound. In the case that the "web" button 11E was clicked, the album data AL is stored in the storage means 31, and provided for viewing over the network 1.

Note that in the case that the album data AL is output by printing, a page is printed for image data sets S0 corresponding to each photography location on the map 18A. In addition, regarding a single page, icons 18C are specified on the map 18A by being enclosed in a circle 18L or the like. The image data sets S0 which have been photographed at the photography locations indicated by the specified icons are displayed on the page. Note that as prints cannot reproduce audio data, the "play" button shown in FIG. 12 is not displayed on the prints.

The personal computer 2 judges whether an end command has been input (step S52), and if the judgment in step S52 is affirmative, the process is ended. If the judgment in step S52 is negative, the process returns to step S16. Note that in the case that the judgment in step S32 or step S48 is negative, the process proceeds to step S52, and it is judged whether an end command has been input.

Note that it is possible for the printing to be performed by the user's printer, connected to the personal computer 2.

As described above, the present embodiment generates travel route data, which includes the user's travel route as well as times of passage through desired positions along the travel route, from the departure point, the final destination, the date and time of departure, and the date and time of arrival at the final destination, input by the user. A map data set MP is selected from the map database DB1 based on the travel route data. Photography locations of image data sets S0 are estimated based on the travel route data and time data, which represents dates and times of photography, attached to the image data sets S0. Then, album data AL is generated, in which locations along the travel route 18B on the map 18A, represented by the map data set MP, are correlated with the photography locations of the image data sets S0.

Therefore, as long as the travel route data is obtained, the image data sets S0 are easily correlated to the photography locations thereof, along the travel route 18B on the map 18A. Accordingly, the image data sets S0 and the photography locations are easily correlated, thereby enabling easy generation of the album data AL.

In addition, data related to the photography location of an image data set, such as third party image data sets and spot data may be obtained, and the album data may be generated having the related data correlated to the map data set. Thereby, data related to the photography location of the image data set may also be included in the album data AL, in addition to the image data sets S0. Accordingly, the contents of the album can be enriched.

Further, the travel route data is obtained based at least on data regarding: a departure point, a final destination, a date and time of departure, and a date and time of arrival at the final destination. Therefore, the travel route data can be obtained, requiring only comparatively simple input by the user. The necessity for the user to carry means to obtain data representing a photography location of an image data set, such as a GPS means or a cellular telephone, is obviated. Accordingly, the burden on the user is reduced in the obtainment of the travel route data.

Still further, the map data set MP, which includes the travel route, may be obtained based also on user data of the user who generates the album. Therefore, a map data set MP reflecting the preferences of the user may be obtained, and the contents of the album, represented by the album data AL, may more suit the user's preferences.

Note that in the embodiment described above, the travel route data is obtained based on data regarding the departure point, the final destination, the date and time of departure, the date and time of arrival at the final destination, and the method of travel. However, in the case that the user's digital camera is equipped with a GPS function, GPS data, which represents the photography location, is attached to the image data sets S0 obtained by photography thereby. Accordingly, if the data representing the photography location is attached to the image data sets S0, the travel route data can be obtained based on the photography location data attached to the image data sets S0. In this case, the input of the departure point, the final destination, the date and time of departure, the date and time of arrival at the final destination, and the method of travel employing the travel route data generation screen 13 shown in FIG. 7 is obviated.

In addition, in the embodiment described above, if the "third party image" button 12C is clicked, third party image data sets corresponding to the position clicked on the map are transmitted to the personal computer 2, to be included in the album data AL. However, video data correlated to the clicked location may be employed as the third party image data sets, instead of the image data sets.

Further, in the embodiment described above, the map data set MP is selected based on the travel route data and the user data. However, it is preferable that the album generation 33 has a learning function to learn the selection pattern of map data sets MP for each user, to gradually reduce the number of candidates of map data sets MP to be selected according to the user. Thereby, efficient selection of map data sets MP for each user is enabled.

Still further, in the embodiment described above, the personal computer 2 accesses the album generation support server 3, and the album data AL is generated by the album generation support server 3. However, the data stored in the storage means 31 may be stored in the personal computer 2, and software may be installed in the personal computer that enables performance of the processes performed by the album generation server 33. Thereby, the user is enabled to generate the album data AL without accessing the album generation support server 3, by employing the personal computer 2.

The method of album generation of the present invention may be provided as a program that causes a computer to execute the method. The program may be recorded on a computer readable medium. A skilled artisan would know that the computer readable medium is not limited to any specific type of storage device, and includes any kind of device, including but not limited to CD's, floppy disks, RAM's, ROM's, hard disks, magnetic tapes and internet downloads, in which computer instructions can be stored and/or transmitted. Transmission of computer code through a network or through wireless transmission means is also within the scope of the present invention. Additionally, computer code/instructions include, but are not limited to, source, object, and executable code and can be in any language including but not limited to higher level languages, assembly language and machine language.

What is claimed is:

1. A computer implemented method for generating an album based on album data including at least one image data set, which has been photographed during a trip and which has time data representing a time of photography attached thereto, comprising the steps of:
   obtaining travel route data, which includes data related to the route taken during the trip and times of passage through desired positions along the route;
   obtaining a map data set that contains the route from a map database which stores a plurality of map data sets, based on the travel route data;
   estimating a photography location based on the travel route data and the time data;
   generating photography data which represents that the image data set was obtained at the photography location along the route;
   attaching the photography data to the map data set; and
   generating album data including the map data set, in which the photography data is correlated with the image data set.

2. A computer implemented method for generating an album as defined in claim 1, further comprising the steps of:
   obtaining related data, which is related to the photography location; and
   generating album data, in which the related data is correlated with the map data set.

3. A computer implemented method for generating an album as defined in claim 1, wherein:
   the travel route data is obtained based at least on data regarding: a departure point; a final destination; date and time of departure; date and time of arrival at the final destination; and method of travel.

4. A computer implemented method for generating an album as defined in claim 1, wherein:
   the map data set is obtained based also on user data of a user who generates the album.

5. An album generating apparatus that generates album data including at least one image data set, which has been photographed during a trip and which has time data representing a time of photography attached thereto, comprising:
   travel route data obtaining means for obtaining travel route data, which includes data related to the route taken during the trip and times of passage through desired positions along the route;
   map data set obtaining means for obtaining a map data set that contains the route from a map database which stores a plurality of map data sets, based on the travel route data;
   photography location estimating means for estimating a photography location based on the travel route data and the time data;
   photography data generating means for generating photography data which represents that the image data set was obtained at the photography location along the route;
   photography data attaching means for attaching the photography data to the map data set; and
   album data generating means for generating album data including the map data set, in which the photography data is correlated with the image data set.

6. An album generating apparatus as defined in claim 5, wherein:
   the album data generating means further obtains related data, related to the photography location, and correlates the related data to the map data set.

7. An album generating apparatus as defined in claim 5, wherein:
   the travel route data obtaining means obtains the travel route data based at least on data regarding: a departure point; a final destination; date and time of departure; date and time of arrival at the final destination; and method of travel.

8. An album generating apparatus as defined in claim 5, wherein:
   the map data set obtaining means obtains the map data set based also on user data of a user who generates the album.

9. A program that causes a computer to execute a method for generating an album based on album data including at least one image data set, which has been photographed during a trip and which has time data representing a time of photography attached thereto, the program comprising the procedures of:
   obtaining travel route data, which includes data related to the route taken during the trip and times of passage through desired positions along the route;
   obtaining a map data set that contains the route from a map database which stores a plurality of map data sets, based on the travel route data;
   estimating a photography location based on the travel route data and the time data;
   generating photography data which represents that the image data set was obtained at the photography location along the route;
   attaching the photography data to the map data set; and
   generating album data including the map data set, in which the photography data is correlated with the image data set.

10. A program as defined in claim 9, further comprising the procedure of:
    obtaining related data, related to the photography location; and wherein
    the procedure for generating album data correlates the related data with the map data set.

11. A program as defined in claim 9, wherein:
    the procedure for obtaining the travel route data obtains the travel route data based at least on data regarding: a departure point; a final destination; date and time of departure; date and time of arrival at the final destination; and method of travel.

12. A program as defined in claim 9, wherein:
the procedure for obtaining the map data set obtains the map data set based also on user data of a user who generates the album.

13. A computer readable medium storing thereon a program that causes a computer to execute a method for generating an album based on album data including at least one image data set, which has been photographed during a trip and which has time data representing a time of photography attached thereto, the program comprising the procedures of:
obtaining travel route data, which includes data related to the route taken during the trip and times of passage through desired positions along the route;
obtaining a map data set that contains the route from a map database which stores a plurality of map data sets, based on the travel route data;
estimating a photography location based on the travel route data and the time data;
generating photography data which represents that the image data set was obtained at the photography location along the route;
attaching the photography data to the map data set; and
generating album data including the map data set, in which the photography data is correlated with the image data set.

14. A computer readable medium as defined in claim 13, wherein the program further comprises the procedure of:
obtaining related data, related to the photography location; and wherein
the procedure for generating album data correlates the related data with the map data set.

15. A computer readable medium as defined in claim 13, wherein:
the procedure for obtaining the travel route data obtains the travel route data based at least on data regarding: a departure point; a final destination; date and time of departure; date and time of arrival at the final destination; and method of travel.

16. A computer readable medium as defined in claim 13, wherein:
the procedure for obtaining the map data set obtains the map data set based also on user data of a user who generates the album.

* * * * *